Figure 1:
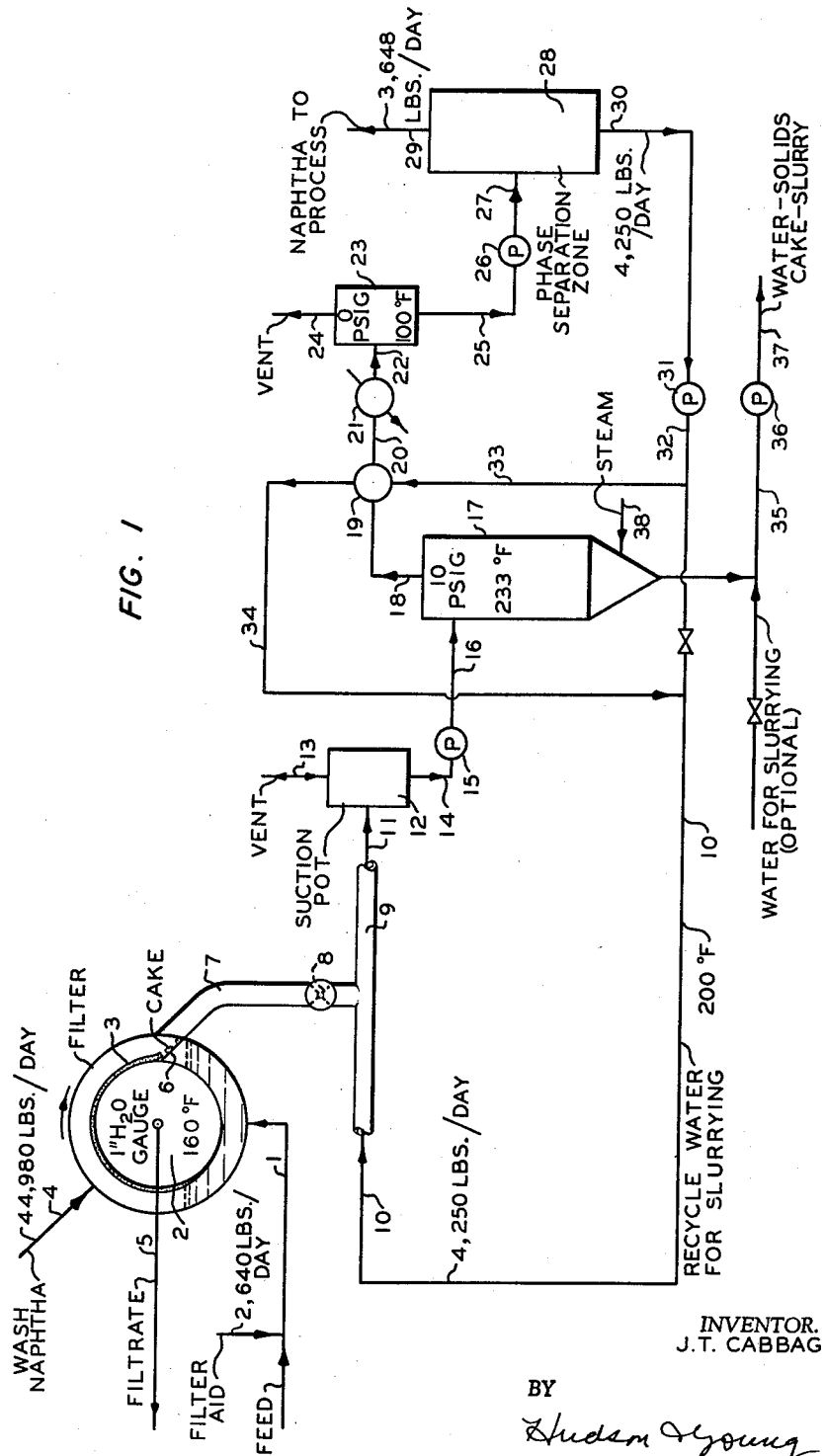

INVENTOR.
J. T. CABBAGE

United States Patent Office 3,084,119
Patented Apr. 2, 1963

3,084,119
RECOVERY OF WASH SOLVENT FROM FILTER CAKE
John T. Cabbage, Bartlesville, Okla., assignor to Phillips Petroleum Company, a corporation of Delaware
Filed Jan. 12, 1960, Ser. No. 1,934
3 Claims. (Cl. 208—321)

This invention relates to a method for the recovery of wash solvent from a filter cake. It also relates to an apparatus for the recovery of a wash solvent from a filter cake. In one of its aspects, the invention relates to a combination of steps in which water is used for at least a two-fold purpose; (1) to convey a filter cake containing residual wash solvent and (2) to aid in stripping wash solvent from the cake in a later stripping step. In another of its aspects, the invention relates to the recovery of wash solvent from a filter cake employing steam to accomplish a two-fold purpose; (1) to aid in conveying filter cake and (2) to assist in a later stripping operation. In a more specific aspect, the invention relates to the recovery of a wash solvent or naphtha from a filter cake used in the preparation of a lubricating oil additive consisting essentially of calcium petroleum sulfonate.

Although the invention will now be described with respect to a specific application of the same, it will be obvious to those skilled in the art in possession of this disclosure and having studied the same that the invention can be applied to those situations wherein conditions are similar to those set forth herein.

In the production of calcium petroleum sulfonate, as latter described, there is obtained a filter cake containing residual wash naphtha, usually a high boiling point naphtha, and this naphtha must be recovered from the cake. The filter cake forms a "mud" when mixed with water and the use of a conventional heat jacketed conveyor is simply not practical.

It has been found that the naphtha can be recovered from the filter cake by slurrying the same with a relatively large quantity of water, passing the slurry to a steam stripper and therein stripping from the cake the naphtha which must be recovered following which the naphtha-water condensate is separated to recover the water for reuse in the recovery system, and the naphtha as product of the process for reuse in the sulfonation and filtration system.

An object of the invention is to provide a method for the recovery of a wash solvent from a filter cake. Another object of the invention is to provide an apparatus for the recovery of wash solvent from a filter cake. A further object of the invention is to provide for a method of so recovering a wash solvent from a filter cake that the agent used in conveying the filter cake can also be used in a later operation in the system.

Other aspects, objects, and the several advantages of the invention are apparent from a study of the disclosure, the drawings, and the appended claims.

According to the present invention there is provided a method for the recovery of a wash solvent or naphtha from a filter cake which is used in the preparation of a calcium petroleum sulfonate, which comprises slurrying said cake as obtained from the filter with water in a quantity sufficient to convey the slurry to a stripping zone; in the stripping zone, heating the slurry to, in effect, steam distill over the solvent or naphtha, condensing the overhead, separating the naphtha and water, which can be recycled for reuse, thus providing hot water for the slurrying and, indeed, pre-conditioning of the cake before it is stripped; and obtaining a stripped water-solids slurry for use as desired.

Also according to the invention, there is provided a method for the recovery of a wash solvent or naphtha from a filter cake which comprises suspending said cake as obtained from the filter in steam to form a steam-solids suspension, passing the supension thus obtained to a stripping zone; in the stripping zone, recovering the wash solvent or naphtha vapor and steam, passing the steam and naphtha mixture through a cooling zone, therein cooling the same to below the condensation temperature under the conditions of operation, passing the naphtha and water to a phase separation zone, recovering water from the phase separation zone, heating the water to convert it to steam and using the steam as described and recovering naptha from said phase separation zone, and in a preferred embodiment, reusing the naphtha also as described; and obtaining a stripped water-solids slurry from the bottom of the stripper for use as desired.

Also according to the invention, there is provided an apparatus for the recovery of a wash solvent from a filter cake, which is not readily conveyed by ordinary means, which comprises means for suspending the cake as obtained in water or steam, means for stripping a slurry thus obtained and means for conveying the slurry thus obtained from said means for suspending to said means for stripping. Further according to the invention, an appartus is provided for recovering wash solvent or naptha from a filter cake, which comprises means for suspending said filter cake in steam, means for supplying steam to said first means and a stripping means and means for supplying the suspension of the filter cake in steam to said stripping means. Still further according to the invention, there is provided a heating means for heating water recovered following stripping of the filter cake to heat the water to convert the same into steam, which is used as the suspending or conveying steam.

Figure 2:
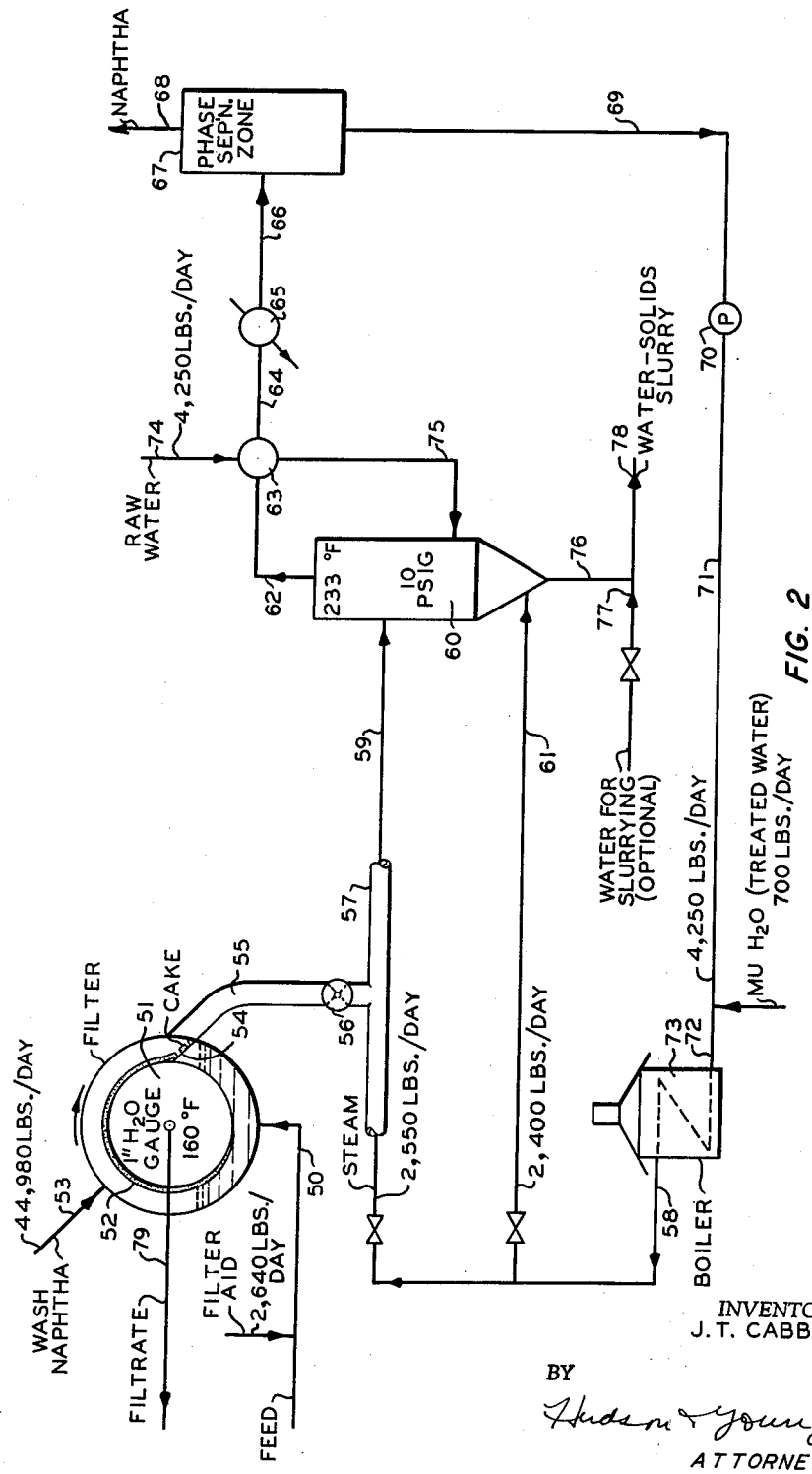

Referring now to the drawing, in FIGURE 1 there is shown an embodiment in which water is used for slurrying the filter cake. In FIGURE 2, there is shown an embodiment for steam suspending and slurrying the filter cake.

Referring now to FIGURE 1 of the drawing, the calcium petroleum sulfonate product to be filtered and washed with naphtha is fed by pipe 1 onto rotary filter 2, forming a cake 3 on the filter. Wash naphtha, 300 to 360° F. boiling range, is sprayed onto the filter cake through pipe 4 to wash the sulfonate from the cake into the filtrate, filtrate and wash naphtha being removed at 5 from the filter which, in this embodiment, is a rotary type suction filter. A thin layer of filter cake is peeled from the cake with each rotation of the filter 2 by blade 6 and is passed by transfer pipe 7 and star valve 8 into conveying pipe 9. Water which is somewhat below its boiling point under the conditions of operation is pumped from pipe 10 into pipe 9, forming a slurry which is passed by pipe 11 into pump suction pot 12, which is vented at 13, and the slurry is then passed by pipe 14, pump 15 and pipe 16 into stripper 17. Overhead from stripper 17 is passed by pipe 18, heat exchanger 19, pipe 20, cooler 21, and pipe 22 to gas separator 23, from which uncondensed gases are vented by 24. A water-solvent mixture is then passed by pipe 25, pump 26, and pipe 27 into phase separator 28, from which naphtha is recovered for reuse as desired by pipe 29. Water removed from separator 28 is passed by pipe 30, pump 31, pipe 32, pipe 33, heat exchanger 19, pipes 34 and 10 into suspension or slurry pipe 9. A water-solids slurry is recovered from stripper 17 by pipe 35, pump 36, and pipe 37 as a product and steam is introduced into stripper 17 by pipe 38.

Table I is a specific example of the operation of FIGURE 1. The number or numbers at the head of each column pertain to correspondingly numbered streams in the drawing.

Table I

| Components, lb./day | (1) Feed to filter | (5) Filtrate | (7) Cake to stripper | (10) Recycle water | (16 and 38) Total to stripper | (18) stripper overhead | (35) stripper bottoms | (38) Steam to stripper |
|---|---|---|---|---|---|---|---|---|
| Calcium inorganics | 3,990 | | 3,990 | | 3,990 | | 3,990 | |
| Water [1] | W 180 | | W 180 | [4] W 4,250 | [6] 9,380 | S 4,250 | W 5,130 | [3] S 4,950 |
| Naphtha | [2] 136,530 | 132,810 | 3,720 | | 3,720 | 3,648 | 72 | |
| Calcium petroleum sulfonate | 57,750 | 57,640 | 110 | | 110 | | 110 | |
| Filter aid [5] | 2,640 | | 2,640 | | 2,640 | | 2,640 | |
| Total | 201,090 | 190,450 | 10,640 | 4,250 | 19,840 | 7,898 | 11,942 | 4,950 |

[1] Water is superscript "W," steam is "S."
[2] Includes 44,980 lb./day wash naphtha.
[3] Steam is 150 lbs. saturated.
[4] Recycle water at 200° F.
[5] Diatomaceous earth "Filter-Cel." (To filter on separate precoat operation.)
[6] Comprises: 4,950 #/D steam to stripper; 180 #/D water in cake; 4,250 #/D water to slurry cake to stripper.

Referring now to FIGURE 2, feed which is similar to that used in FIGURE 1, is passed by 50 into filter unit 51 wherein a precoat filter cake 52 on the rotary filtering surface of the filter is used to remove solids from the filtrate, filtrate being removed by pipe 79. Wash naphtha is sprayed on the cake from 53 and washed cake is removed by edge 54, a thin layer being removed during each rotation of the filter, into transfer pipe 55, which drops through star valve 56 into suspension or conveying pipe 57. Steam from pipe 58 is passed into pipe 57 and therein suspends the cake passing by pipe 59 into stripper 60. There is introduced into the bottom of stripper 60 live steam by pipe 61 and there is taken over by pipe 62 a mixture of steam and naphtha, which is passed by heat exchanger 63, pipe 64, cooler 65, and pipe 66 into phase separation zone 67, from which naphtha is taken overhead by pipe 68 for storage or reuse as desired. Bottoms from phase separation zone 67 are passed by pipe 69, pump 70, pipe 71, and pipe 72 to boiler 73, which converts the water to steam, which passes by pipe 58 for use as earlier described and by pipe 61 also for reuse as earlier described. Fresh water is added directly into stripper 60 by pipe 74, heat exchanger 63, and pipe 75. A solids-water slurry is recovered from the bottom of stripper 60 by valved pipe 76 and conveyed with water introduced by pipe 77 through pipe 78 to storage or for further processing, or to disposal, as desired.

In Table II are shown data pertinent to the operation of FIGURE 2.

major portion of the water by drying; then diluted with a solvent hydrocarbon, and finally then processed as shown in the drawings.

Reasonable variation and modification are possible within the scope of the foregoing disclosure, the drawings, and the appended claims to the invention the essence of which is that there have been provided a method and means for the recovery of wash solvent or naphtha from a filter cake difficult to convey by ordinary conveying means, by slurrying or suspending the same with water and/or steam and conveying the same directly or with intermediate venting to a stripping zone substantially as described.

I claim:

1. A method of treating a water insoluble filter cake which has been washed with a water insoluble organic solvent which comprises removing the filter cake from the filter, flowing a stream of steam into and through an elongated zone, suspending said filter cake by the action of said flowing stream of steam in said elongated zone, conveying the slurry thus formed by the action of said flowing stream to a stripping zone, therein stripping said solvent from said filter cake, obtaining vapors containing solvent and steam, cooling and condensing said vapors forming a solvent phase and an aqueous phase, returning the aqueous phase for reuse in the operation and returning the solvent for reuse in said washing.

2. A method of treating a calcium petroleum sulfonate filter cake which has been washed with a naphtha which

Table II

| Components lb./day | (50) Feed to filter | (52) Filtrate | (55) Cake to stripper | (62) Stripper overhead | (71) Recycle water to boiler | (72) Outside condensate | (74) Raw water | (74, 59 and 61) Total to stripper | (76) stripper bottoms |
|---|---|---|---|---|---|---|---|---|---|
| Calcium inorganics | 3,990 | | 3,990 | | | | | 3,990 | 3,990 |
| Water [1] | W 180 | | W 180 | S 4,250 | [4] W 4,250 | 700 | 4,250 | [6] 9,380 | W 5,130 |
| Naphtha | [2] 136,530 | 132,810 | 3,720 | 3,648 | | | | 3,720 | 72 |
| Calcium petroleum sulfonate | 57,750 | 57,640 | 110 | | | | | 110 | 110 |
| Filter aid [5] | 2,640 | | 2,640 | | | | | 2,640 | 2,640 |
| Total | 201,090 | 190,450 | 10,640 | 7,898 | 4,250 | 700 | 4,250 | 19,840 | 11,942 |

[1] Water is superscript "W," steam is "S."
[2] Includes 44,980 lb./day wash naphtha.
[3] Steam is 150 lbs. saturated.
[4] Recycle water at 200° F.
[5] Diatomaceous earth "Filter-Cel." (Added to filter in separate precoat operation.)
[6] Comprises: 2,550 #/day steam to flow cake to stripper; 2,400 #/day steam to stripper; 180 #/day water in cake; 4,250 #/day raw water.

A careful study of this disclosure will indicate to one skilled in the art in possession of the same that the water and/or steam perform several functions in a neat combination which permit readily handling of the filter cake and efficient recovery of washed solvent or naphtha.

The calcium petroleum sulfonate to which reference is made herein is produced by sulfonation of a refined Mid-Continent lubricating oil, the sulfonated product being then neutralized with aqueous lime; then depleted of a comprises flowing a stream of hot water into an elongated zone, separating the cake from the filter and suspending said calcium petroleum sulfonate filter cake in said flowing stream by the action of said flowing stream, conveying the slurry thus formed by the action of said flowing stream to a stripping zone, therein stripping naphtha from said calcium petroleum sulfonate filter cake, obtaining vapors containing naphtha and steam, cooling and condensing said vapors forming a naphtha phase and an aqueous phase, returning the aqueous phase for reuse in said slurrying and returning the naphtha for reuse in said washing.

3. A method of treating a calcium petroleum sulfonate filter cake which has been washed with a naphtha which comprises flowing a stream of steam into an elongated zone, separating the filter cake from the filter and suspending said calcium petroleum sulfonate filter cake in said flowing stream by the action of said flowing stream, conveying the suspension thus formed by the action of said flowing stream to a stripping zone, therein stripping naphtha from said calcium petroleum sulfonate filter cake, obtaining vapors containing naphtha and steam, cooling and condensing said vapors forming a naphtha phase and an aqueous phase, returning the aqueous phase for reuse in said operation and returning the naphtha for reuse in said washing.

References Cited in the file of this patent

UNITED STATES PATENTS

| | | |
|---|---|---|
| 2,020,693 | Manley et al. | Nov. 12, 1935 |
| 2,040,056 | Manley | May 5, 1936 |
| 2,347,927 | Patterson et al. | May 2, 1944 |
| 2,423,172 | Booth | July 1, 1947 |
| 2,572,433 | Bergstrom et al. | Oct. 23, 1951 |
| 2,798,102 | Schaeffer et al. | July 2, 1957 |
| 2,849,513 | Schaeffer | Aug. 26, 1958 |
| 2,918,263 | Eichhorn | Dec. 22, 1959 |

OTHER REFERENCES

Chemical Engineering Practice, Cremer and Davies, vol. 6, 1958, page 517, published by Academic Press Inc., New York.